(12) United States Patent
Abe

(10) Patent No.: US 6,886,874 B2
(45) Date of Patent: May 3, 2005

(54) FINISHER FOR A VEHICLE

(75) Inventor: Yasuyuki Abe, Yokohama (JP)

(73) Assignee: Hashimoto Forming Industry Co., Kanagawa-Ken (JP)

( * ) Notice: Subject to any disclaimer, the term of this patent is extended or adjusted under 35 U.S.C. 154(b) by 0 days.

(21) Appl. No.: 10/763,637

(22) Filed: Jan. 22, 2004

(65) Prior Publication Data

US 2004/0262932 A1 Dec. 30, 2004

(30) Foreign Application Priority Data

Jun. 30, 2003 (JP) ........................................ 2003-187067

(51) Int. Cl.[7] .............................. B60J 5/10; B62D 39/00
(52) U.S. Cl. ................. 296/1.08; 296/146.1; 296/146.6
(58) Field of Search ............................... 296/1.08, 1.07, 296/146.1, 147, 148, 152, 154, 146.5, 146.7, 146.8, 146.9, 191, 50, 56; 292/201

(56) References Cited

U.S. PATENT DOCUMENTS

| | | | | |
|---|---|---|---|---|
| 5,295,374 A | * | 3/1994 | Bender et al. ................. 70/208 |
| 5,316,364 A | * | 5/1994 | Ohya ....................... 296/146.5 |
| 5,377,450 A | * | 1/1995 | Varajon ......................... 49/502 |
| 5,947,540 A | * | 9/1999 | Pariseau et al. ............ 296/57.1 |
| 6,019,418 A | * | 2/2000 | Emerling et al. ......... 296/146.8 |
| 6,079,767 A | * | 6/2000 | Faubert et al. ............... 296/155 |
| 6,139,088 A | * | 10/2000 | Okamoto et al. ......... 296/146.6 |
| 6,174,016 B1 | * | 1/2001 | Ponziani ....................... 296/56 |
| 6,666,496 B2 | * | 12/2003 | Rettig ...................... 296/146.1 |
| 6,669,267 B1 | * | 12/2003 | Lynam et al. ............. 296/146.5 |
| 6,805,398 B2 | * | 10/2004 | Harima et al. ............ 296/146.7 |

FOREIGN PATENT DOCUMENTS

JP  2001-152710 A  6/2001

* cited by examiner

*Primary Examiner*—D. Glenn Dayoan
*Assistant Examiner*—Greg Blankenship
(74) *Attorney, Agent, or Firm*—Thelen Reid & Priest, LLP

(57) ABSTRACT

A switch that implements or removes operation restrictions of a keyless entry system for a back door or trunk is easily mounted on a door panel. A finisher for a vehicle includes: an elongated body; a plurality of mounting portions that are formed protruding from a rear surface side of the body, mounting members that are mounted on a vehicle body being either held by or fixed to the mounting portions; and a bracket formed in an elongated shape and having a switch in a vicinity of a center portion in a longitudinal direction thereof. The bracket is aligned along a longitudinal direction of the body, and two end portions of the bracket are each mounted on the mounting portions in such a manner that a bridge is formed between two adjacent mounting portions from among the plurality of mounting portions, and the switch is able to be operated from a vehicle exterior side of the body.

4 Claims, 9 Drawing Sheets

FINISHER FOR A VEHICLE

BACKGROUND OF THE INVENTION

1. Field of the Invention

Priority is claimed on Japanese application No. 2003-187067, filed Jun. 30, 2003, the content of which is incorporated herein by reference.

The present invention relates to a finisher for a vehicle that allows a switch for disabling and enabling operations of keyless entry systems such as back doors, trunks, and the like to be easily fitted in a door panel or the like.

2. Description of Related Art

Conventionally, as is described in Japanese Patent Application, First Publication (JP-A) No. 2001-152710, for example, a door handle used in an electronic lock release type of door in a vehicle is known in which, in a door handle having a concave area into which a hand can be inserted, a lifting type of operation portion and a switch that performs a release operation on an electronic lock are installed within an aperture formed on a top surface of the concave area, and a spring member that presses the switch and a spring member that causes the operation portion to be reset are provided between the operation portion and the switch. In this type of door handle, because the operating force on the operation portion is transmitted to the switch via a spring member it is possible to reduce the load on the switch and prevent damage to the switch.

In recent years, keyless entry systems in which a door is locked or unlocked by a remote operation without an ignition key being used have been employed in automobiles and the like. These systems do away with the troublesome task of having to insert an ignition key in a door key cylinder and then rotate it each time the car door is locked or unlocked. In these systems, a lock signal or an unlock signal is transmitted by radio wave or the like towards a receiving circuit installed inside a vehicle from a transmission circuit built into the ignition key. In the apparatus in the vehicle that receives the signal the door key is either locked or unlocked depending on the received signal and the state of the lock when the signal is received. However, on the contrary, it is inconvenient if the state of the door lock is immediately switched when a user carrying the ignition key unintentionally approaches the vehicle. Therefore, the operation of the entry system can be restricted such that the state of the door lock is not altered even if a signal is received, and a switch that implements or removes such operation restrictions is mounted on the vehicle or the like.

However, if an operation restriction/release switch is installed in an obvious position such as on the back door, then there is a possibility of a person other than the user (for example, a child) damaging the switch in some manner. Therefore, in order to inhibit the switch being operated by anyone other than the user it was conceived that the switch could be formed integrally with a finisher so that it did not stand out. However, because a finisher is formed having a narrow, elongated shape, when a sizeable load acted on the switch, stress sufficient for the finisher to be deformed was applied to the finisher, which prevented the finisher from being used for this purpose. In the mechanism used in the door handle described in JP-A No. 2001-152710, the mechanism around the switch ends up becoming complex which makes it difficult to be applied in a narrow, elongated finisher.

The present invention was conceived in view of the above circumstances and it is an object thereof to provide a finisher for a vehicle that allows a switch that restricts an operation of a keyless entry system of a trunk or back door or the like or removes such a restriction to be mounted easily in a door panel or the like.

SUMMARY OF THE INVENTION

In order to solve the above problems, the present invention is a finisher for a vehicle having: an elongated body; a plurality of mounting portions that are formed protruding from a rear surface side of the body, and which mounting members that are mounted on a vehicle body are either held by or fixed to; and a bracket formed in an elongated shape and having a switch in a vicinity of a center portion in a longitudinal direction thereof, wherein the bracket is aligned along a longitudinal direction of the body, and two end portions of the bracket are mounted on the mounting portions in such a manner that a bridge is formed between two adjacent mounting portions from among the plurality of mounting portions, and the switch is operable from a vehicle exterior side of the body.

It is also possible to provide the bracket and the mounting portions with a positioning and engaging portion that determines a positional relationship between the bracket and the mounting portions.

It is preferable for the switch to be exposed via a through hole formed in the body to the outside of a vehicle in a state of being set slightly back from an exterior surface of the finisher or being essentially flush with the exterior surface of the finisher.

It is also possible for the switch to be formed integrally with the bracket by outsert molding.

BRIEF DESCRIPTION THE DRAWINGS

DETAILED DESCRIPTION OF THE INVENTION

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

The present invention will now be described in detail based on embodiments thereof.

Figure 1:
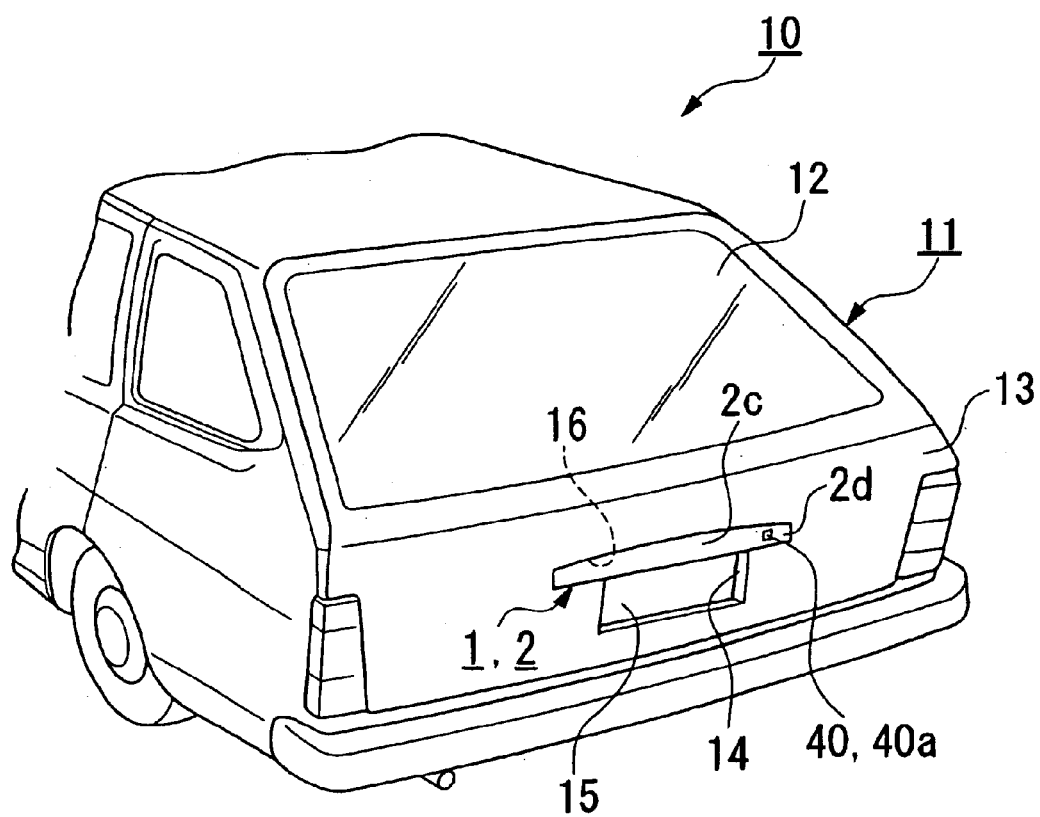
FIG. 1 is a perspective view showing a rear portion of a vehicle such as an automobile in which the finisher for a vehicle of the present invention is mounted.
Figure 2:
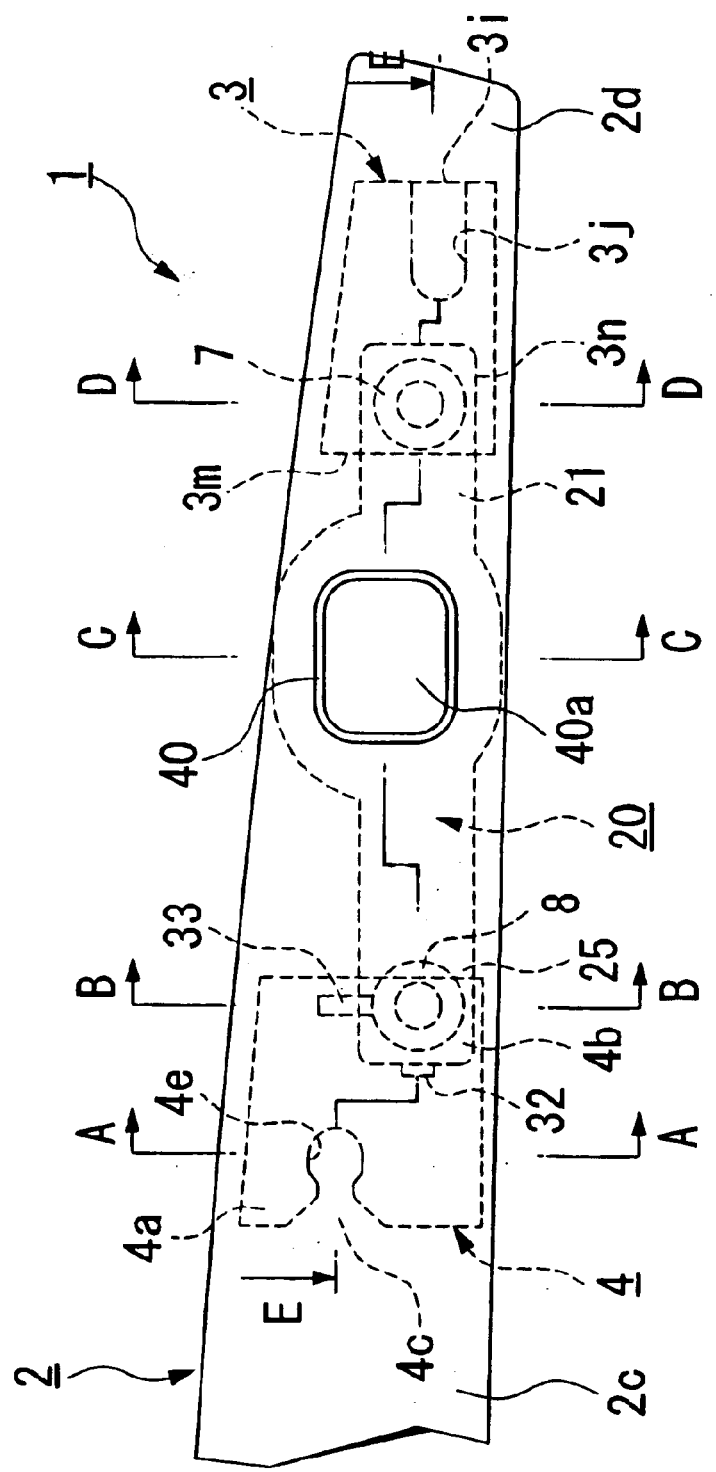
FIG. 2 is a frontal view showing an embodiment of the finisher of the present invention.

FIG. 1 is a perspective view showing a rear portion of a vehicle such as an automobile in which the finisher for a vehicle of the present invention (referred to below simply as "finisher") is mounted. FIG. 2 is a frontal view showing an embodiment of the finisher.

Figure 3:
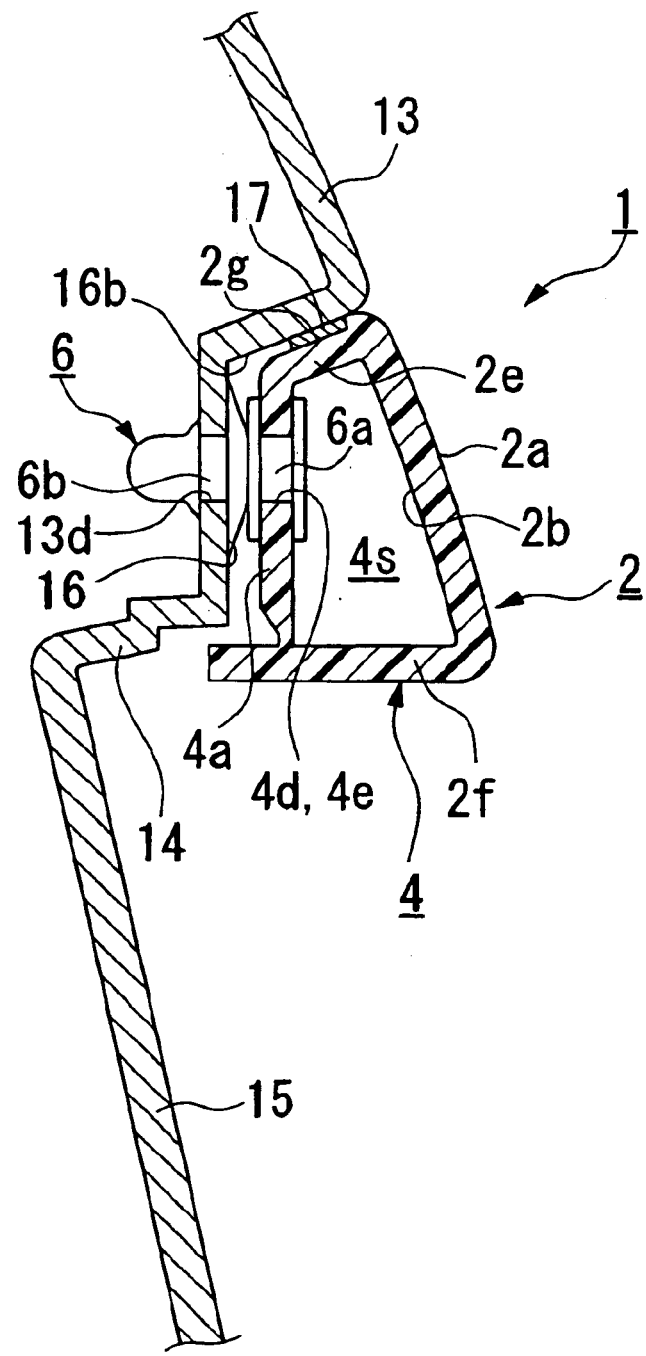
FIG. 3 is a cross-sectional view taken along the line A—A in FIG. 2.
Figure 4:
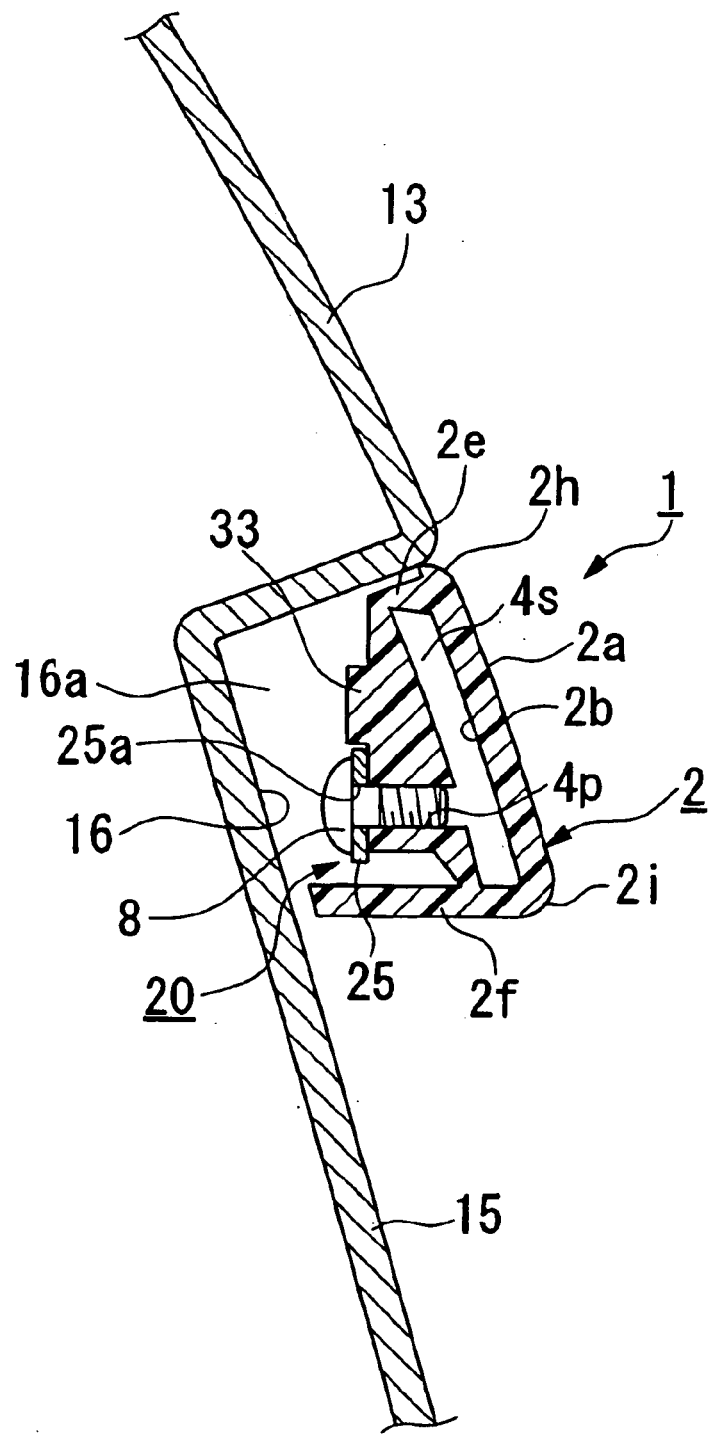
FIG. 4 is a cross-sectional view taken along the line B—B in FIG. 2.
Figure 5:
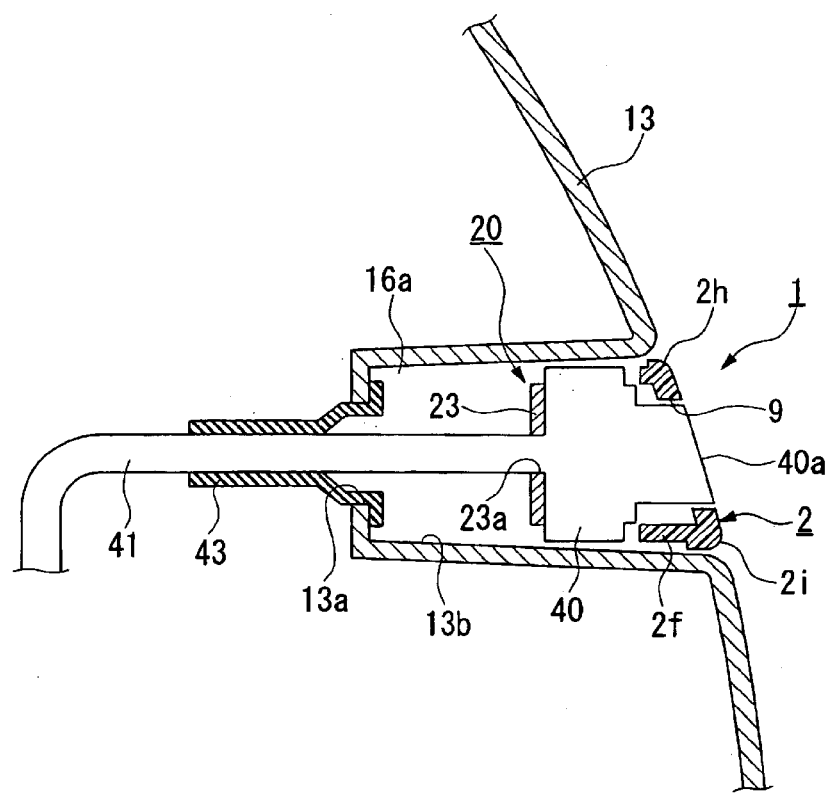
FIG. 5 is a cross-sectional view taken along the line C—C in FIG. 2.
Figure 6:
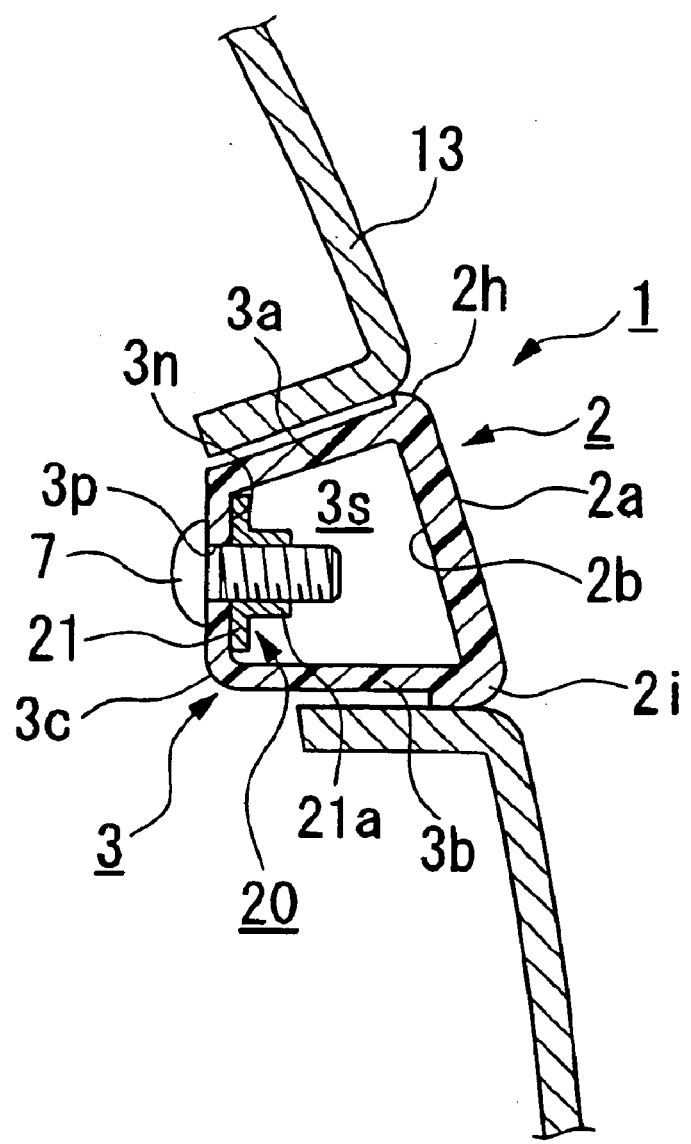
FIG. 6 is a cross-sectional view taken along the line D—D in FIG. 2.
Figure 7:
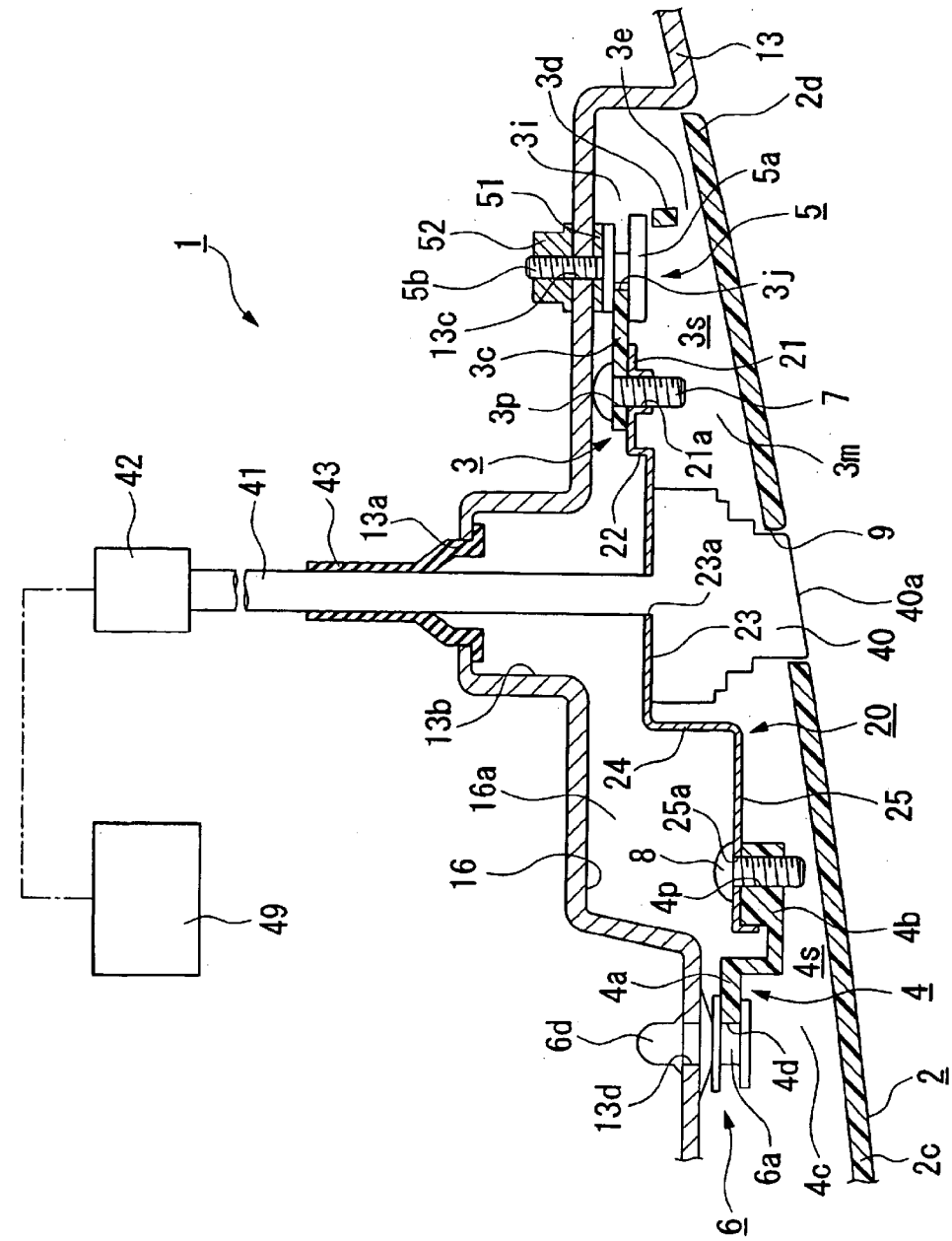
FIG. 7 is a cross-sectional view taken along the line E—E in FIG. 2.

FIG. 3 is a cross-sectional view taken along the line A—A in FIG. 2. FIG. 4 is a cross-sectional view taken along the line B—B in FIG. 2. FIG. 5 is a cross-sectional view taken along the line C—C in FIG. 2. FIG. 6 is a cross-sectional view taken along the line D—D in FIG. 2. FIG. 7 is a cross-sectional view taken along the line E—E in FIG. 2.

Figure 8:
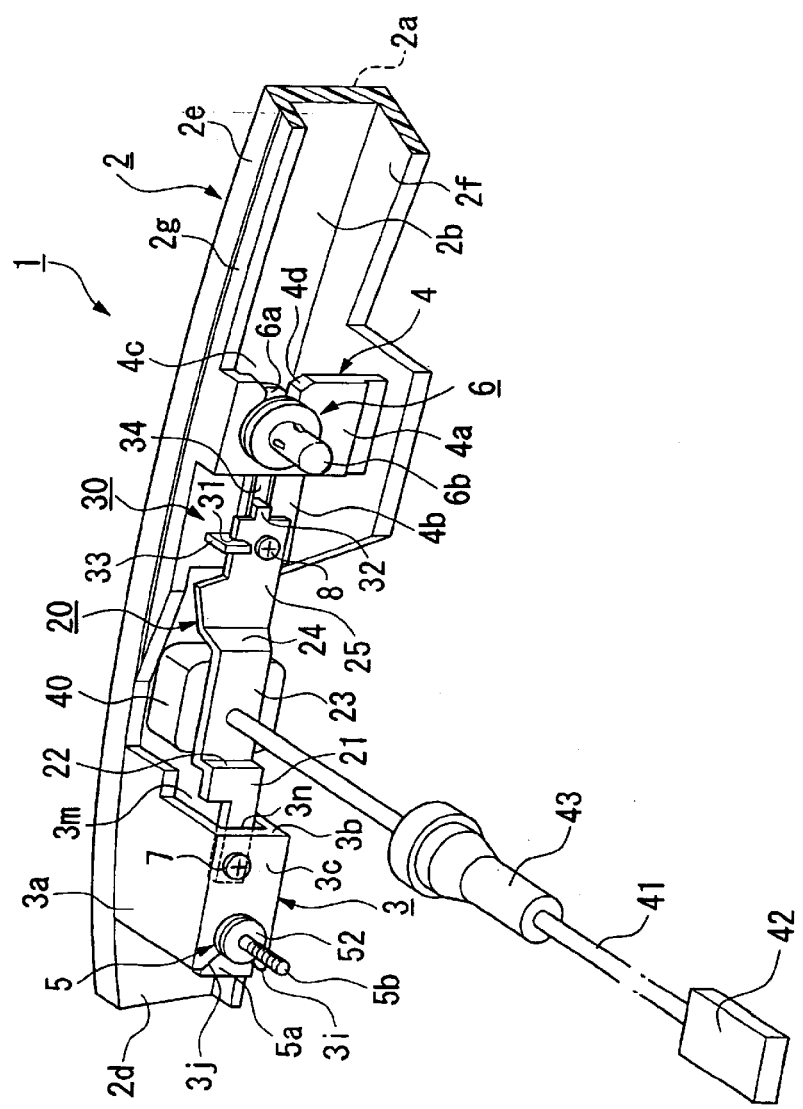
FIG. 8 is a perspective view seen from the rear surface side of the finisher shown in FIG. 2.
Figure 9:
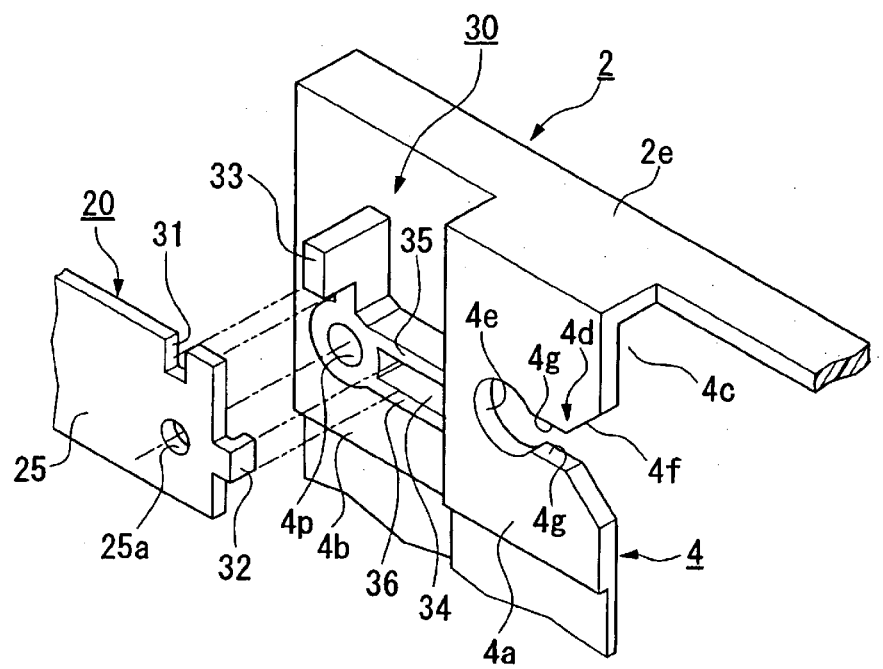
FIG. 9 is an enlarged perspective view of a second mounting portion.

FIG. 8 is a perspective view seen from the rear surface side of the finisher shown in FIG. 2. FIG. 9 is an enlarged perspective view of a second mounting portion.

A back door 11 is provided at a rear surface of a vehicle 10 so as to open towards the rear (i.e., towards an observer looking at FIG. 1). A back window plate 12 is mounted above the back door 11.

A concave portion that forms a license plate mounting portion 15 on which a license plate (not shown) is mounted is formed as a hollow shape via a step portion 14 from the vehicle exterior (i.e., the right hand side in FIGS. 3 and 4) in a central portion in the vehicle transverse direction of a back door outer panel 13 below the back window plate 12. In addition, a concave area that forms a finisher mounting portion 16 on which a finisher 1 is mounted is formed above the license plate mounting portion 15 of the back door outer panel 13.

Note that, although there are localized portions of the back door outer panel 13 where the thickness changes, here the back door outer panel 13 is manufactured by integrated molding from synthetic resin using a large size injection molding apparatus, and it is also possible for the license plate mounting portion 15 and the finisher mounting portion 16 and the like to be formed as deep concave portions. However, the finisher of the present invention is not particularly restricted and it is also possible for the finisher to be mounted on a vehicle body panel such as a back door outer panel manufactured from metal plate.

The finisher 1 is mounted on the finisher mounting portion 16 of the back door outer panel 13 by holding members 5 and 6 that are held by or fixed to mounting portions 3 and 4 described below, and is orientated such that the longitudinal direction thereof runs in the transverse direction of the vehicle.

The finisher 1 has a design surface 2a that forms an exterior surface when the finisher is mounted on a vehicle, an elongated main body 2 (referred to below as "finisher body") formed having a substantially U shaped cross section by an upper flange 2e and a lower flange 2f that are folded backwards from end portions of the design surface 2a so as to stand upwards pointing towards a rear surface, mounting portions 3 and 4 formed so as to bridge the upper flange 2e and the lower flange 2f of the main body 2, and a bracket 20 that is formed in an elongated shape and in a center portion in the longitudinal direction of which a switch 40 is mounted.

The finisher mounting portion 16 has a concave configuration that is hollowed out from the exterior surface of the back door outer pane 13. By mounting the finisher 1 such that it covers the concave shaped finisher mounting portion 16, the design surface 2a of the finisher 1 forms a surface that is essentially flush with the exterior surface of the back door outer panel 13.

The finisher body 2 is a molded component formed by injection molding or the like from a synthetic resin such as an acrylonitrile-butadiene-styrene copolymer (ABS), polybarbonate (PC), polypropylene (PP), a PC/ABS polymer alloy, and the like. The configuration of the finisher body 2 is such that the width (i.e., the dimension in the vertical direction in FIG. 1) thereof is broadest in the central portion in the longitudinal direction thereof, while the width thereof is narrowest at both end portions. The upper flange 2e and the lower flange 2f that protrude in a manner in which they are folded back towards the rear surface 2b are provided respectively at a top edge portion and a bottom edge portion in the transverse direction of the finisher body 2 and extending in the longitudinal direction of the finisher body 2. The fold base portions 2h and 2i of the upper flange 2e and the lower flange 2f are not right angles, and have a radius of curvature within a range of 0.1 to 3 mm.

As is shown in FIG. 7, a center portion 2c in the longitudinal direction (i.e., the left-right direction in FIG. 7) of the finisher body 2 is curved so as to protrude further towards the vehicle exterior (i.e., downwards in FIG. 7) than end portions 2d of the finisher body 2. A housing space 16a capable of housing the mounting portions 3 and 4 of the finisher body 2, the bracket 20 and the like onto which the switch 40 are mounted is secured between the finisher body 2 and the finisher mounting portion 16 (i.e., the back door outer panel 13).

Note that, although not shown in the drawings, when an even greater standard regarding dust proof properties and water proof properties is demanded between the vehicle body panel and the finisher when the finisher is mounted, a spacer and end rubber and the like formed from soft synthetic resin may be attached to peripheral edges of the finisher.

As is shown in FIGS. 2 and 5, the finisher body 2 has a through hole 9 penetrating from the rear surface 2b to the design surface 2a. The through hole 9 is formed so that, when the bracket 20 (described below) is mounted on the rear side of the finisher body 2, an operation portion (i.e., pressing surface) 40a of the switch 40 that is fixed to the bracket 20 is exposed to the outside from the design surface 2a of the finisher body 2. As a result, even when the finisher body 2 covers the bracket 20, it is possible to operate the switch 40 from outside the finisher body 2 by pressing the pressing surface 40a of the switch 40.

The mounting portions 3 and 4 are formed integrally with the finisher body 2. Here, mounting members such as a bolt 5 and a clip 6 are either held or fixed. Note that, here, only the portions 3 and 4 to which the bracket 20 is mounted and fixed are shown as mounting portions for mounting the finisher body 2 on the back door outer panel 13 (i.e., on the vehicle body side), however, as is shown in FIG. 1, portions identical to the mounting portions 3 and 4 are also provided on the side of the finisher body 2 on which the switch 40 is not provided (i.e., on the left side in FIG. 1). However, because it is not necessary for a bracket 20 to be mounted and fixed to these mounting portions, positions corresponding to the bracket mounting portions 3n and 4b (described below) are not necessary here.

As is shown in FIGS. 3 and 8, a spacer 17 formed by double-sided adhesive tape or resin or the like is interposed between a spacer adhesion surface 2g on the top surface of the upper flange 2e of the finisher body 2 and an upper step portion 16b of the finisher mounting portion 16. Vibration in the finisher body 2 is cushioned by the spacer 17, and the generation of rattling noise is suppressed.

The first mounting portion 3 is provided at a position adjacent to an end portion 2d of the finisher body 2. The first mounting portion 3 is formed substantially as a box shape protruding from the rear surface 2b of the finisher body 2. The first mounting portion 3 has a pair of side walls 3a and 3b positioned facing each other in the transverse direction, a top wall 3c that is separated from the rear surface 2b via an inner space 3s of the first mounting portion 3 and that joins the side walls 3a and 3b, and an end wall 3d that joins end portions of the side walls 3a and 3b on the end portion 2d side thereof and that is separated from the rear surface 2b of the finisher body 2 by a gap 3e.

The top wall 3c has a notch shaped insertion groove 3j that holds the mounting member 5 (in this case a bolt) that mounts the finisher body 2 on the vehicle body (i.e., on the back door outer panel 13), a bracket mounting portion 3n to which a first fixing portion 21 of the bracket 20 (described later) is fixed, and a screw hole 3p that is formed in the bracket mounting portion 3n and in which a fastening member 7 (a screw) that fixes the bracket 20 is fastened.

The insertion groove, 3j is formed so as to communicate from an aperture portion 3i that opens onto the side of the finisher body 2 near the end portion 2d. By inserting the bolt 5 such that the head portion 5a thereof is fully inserted in the insertion groove 3j from the aperture portion 3i, the bolt 5 is stably held with the shaft portion 5b of the bolt 5 protruding from the mounting portion 3 towards the vehicle body side thereof (i.e., towards the top of FIG. 7) at a predetermined orientation.

A sealing washer 51 is interposed between the bolt 5 and the back door outer panel 13, and the shaft portion 5b of the bolt 5 is inserted into a mounting hole 13c of the back door outer panel 13. By then screwing a nut 52 onto the shaft portion 5b from the vehicle interior side (i.e., from the top side of FIG. 7) of the back door outer panel 13, the first mounting portion 3 is mounted on and fixed to the back door outer panel 13.

The bracket mounting portion 3n is provided at an inner surface side facing the inner space 3s of the first mounting portion 3. The first fixing portion 21 of the bracket 20 is inserted from an aperture 3m that opens onto a side of the first mounting portion 3 nearest the center portion 2c, and is housed in the inner space 3s. The first fixing portion 21 is then fixed to the bracket mounting portion 3n.

The second mounting portion 4 is provided at a position somewhat closer to the center portion 2c than to the end portion 2d of the finisher body 2 compared to the first mounting portion 3. The second mounting portion 4 has a mounting member holding portion 4a and a bracket mounting portion 4b that are formed so as to form a bridge between the upper flange 2e and the lower flange 2f of the finisher body 2, and an aperture portion 4c that is connected to the mounting member holding portion 4b and that opens from the center portion 2c side of the finisher body 2.

The mounting member holding portion 4a and the bracket mounting portion 4b are provided integrally with each other and separated from the rear surface 2b of the finisher body 2 so as to secure an inner space 4s of the mounting portion 4 that continues on from the aperture portion 4c.

As is shown in FIG. 9, the mounting member holding portion 4a has a slide hole 4d that is formed so as to continue on from the aperture portion 4c. The slide hole 4d has a release portion 4f that continues on from the aperture portion 4c, a through hole 4e that is formed as a C shaped notch that connects with the interior of the release portion 4f, and a pair of projections 4g that can be elastically deformed and that protrude to the inside of the slide hole 4d at a transition portion between the through hole 4e and the release portion 4f.

A head portion 6a of a clip 6 is inserted from the release portion 4f of the slide hole 4d and is pushed as far as the through hole 4e thereby elastically deforming the projections 4g. Consequently, the head portion 6a is fixed by the latches of the protrusions 4g so that it cannot be removed. As a result, an engaging portion 6b of the clip 6 is stably held such that it protrudes from the second mounting portion 4.

By engaging the engaging portion 6b of the clip 6 in an engaging hole 13d formed in the back door outer panel 13, the second mounting portion 4 is mounted on and fixed to the back door outer panel 13.

A second fixing portion 25 of the bracket 20 that is described below is mounted on the bracket mounting portion 4b. This is described below in detail, however, briefly, the bracket mounting portion 4b has a rib 33 that engages with a notch shaped concave portion 31 of the bracket 20, and a groove 34 into which a hook 32 of the bracket 20 is inserted. The groove 34 is formed between a pair of rib shaped side walls 35 and 36. The rib 33 and the groove 34 are positioned so as to surround a screw hole 4p in which a fixing member 8 (a screw) that fixes the bracket 20 is fastened.

The bracket 20 is schematically formed as a plate shaped member from a material having rigidity such as a metal such as steel or stainless steel, a hard plastic, fiber reinforced plastic (FRP) or the like. It is preferable that the material used for the bracket 20 is harder than the material used for the finisher body 2.

The bracket 20 may be formed, for example, in an elongated plate having step portions 22 and 24 by blanking a metal strip into an elongated plate and then forming the step portions.

Specifically, vicinities of both end portions in the longitudinal direction of the elongated bracket 20 form fixing portions 21 and 25 that are used to fix the bracket 20 to the mounting portions 3 and 4 on the finisher body 2 side. The first and second fixing portions 21 and 25 respectively have mounting holes 21a and 25a into which the fixing members 7 and 8 (screws) are inserted.

Here, the periphery of the mounting hole 21a of the first fixing portion 21 protrudes towards the vehicle exterior side of the bracket 20 (i.e., to the right in FIG. 6) and a female thread is formed in an inner surface of the mounting hole 21a. Note that in order to form the female thread in the mounting hole 21a, it is also possible to fasten or weld a nut on the first fixing portion 21.

Here, the mounting portions 3 and 4 protrude from the rear surface 2b side of the finisher body 2. The bracket mounting portions 3n and 4b used to fasten the bracket 20 to the mounting portions 3 and 4 are provided at positions away from the rear surface 2b of the finisher body 2 via the inner spaces 3s and 4s of the mounting portions 3 and 4. Therefore, the bracket 20 forms a bridge between the mounting portions 3 and 4 in a state of being separated from the rear surface 2b of the finisher body 2.

As is described above, the first fixing portion 21 is fixed to the bracket mounting portion 3n of the first mounting portion 3 of the finisher body 2.

The second fixing portion 25 has a concave portion 31 formed in a notch shape that opens from a side portion in the transverse direction of the bracket 20, and a hook 32 that protrudes in the longitudinal direction of the bracket 20.

The concave portion 31 engages with the rib 33 protruding from the second mounting portion 4. The hook 32 is bent towards the rear surface 2b of the finisher body 2 and is engaged with the groove 34 of the second mounting portion 4 by being inserted into the groove 34. The concave portion 31 and the hook 32 are positioned so as to surround a mounting hole 25a in which a fixing member 8 (a screw) that fixes the bracket 20 is fastened.

The width of the concave portion 31, the width of the rib 33 (i.e., the width in the left-right direction in FIG. 8), the width of the hook 32, and the width of the groove 34 (i.e., the width in the up-down direction in FIG. 8) are such that the concave portion 31 can be engaged in a suitable state with the rib 33, and the hook 32 can be engaged in a suitable state with the groove 34.

As a result of the engagement of the concave portion 31 with the rib 33, movement of the bracket 20 in the vehicle transverse direction (i.e., the left-right direction of the vehicle; the left-right direction in FIG. 9) relative to the finisher body 2 is restricted.

As a result of the engagement of the hook 32 with the groove 34, movement of the bracket 20 in the vehicle height direction (i.e., the up-down direction of the vehicle; the up-down direction in FIG. 9) relative to the finisher body 2 is restricted.

In this manner, as a result of the engagements between the concave portion 31 and the rib 33 and between the hook 32 and the groove 34 (i.e., of the positioning engagement portion 30), even if the fixing member 8 is not yet fastened, it becomes difficult for the bracket 20 to move along the surface of the bracket mounting portion 4b of the second mounting portion 4. Moreover, positions of the mounting hole 25a of the second fixing portion 25 of the bracket 20 and the screw hole 4p on the finisher body 2 side of the second mounting portion 4 can be aligned and fixed.

The bracket 20 has a switch seat portion 23 on which the switch 40 is fixed in the center portion in the longitudinal direction between the fixing portions 21 and 25. As is shown in FIG. 8, the switch 40 is larger than the width of the bracket 20 (i.e., than the size of the bracket 20 in the up-down direction in FIG. 8), and can be formed, for example, in an integral state with the bracket 20 by outsert molding.

The switch seat portion 23 has a penetrating hole 23a through which a harness 41 can penetrate extending towards the vehicle interior side (i.e., towards the left in FIG. 5) beyond the switch 40. A connector 42 is mounted on a distal end of the harness 41. A concave portion 13b is also formed at a position on the back door outer panel 13 that is the vehicle interior side of the switch seat portion 23. A through hole 13a through which the harness 41 penetrates is opened in the bottom surface of the concave portion 13b. In addition, a seal member 43 formed from rubber or the like is fitted in order to form a seal between the outer periphery of the harness 41 and the edge of the through hole 13a.

Step portions 22 and 24 are formed between the fixing portions 21 and 25 and the switch seat portion 23. As a result, the strength of the bracket 20 is increased and twisting and bending thereof can be restricted.

As is shown in FIGS. 5 and 7, the pressing surface 40a of the switch 40 is exposed to the outer side of the finisher body 2 by the through hole 9 formed in the finisher body 2, as was described above. In addition, the design surface 2a of the finisher body 2 is essentially flush with the pressing surface 40a of the switch 40.

The switch 40 here is an operation restriction/release switch and is connected to a control section 49 that performs overall control to make a lock release operation possible or impossible for each door lock mechanism provided in all doors of a vehicle body (specifically, to make a lock release operation possible or impossible in an electronic switch or the like that operates the lock release of a door lock mechanism). The control section 49 has an owner identification function and if a pressing operation is performed on the switch 40 when the control section 49 has performed the owner identification function to identify that an owner is approaching the vehicle body, then a lock release operation is allowed for all doors. As long as the lock release operation by the control section 49 is not allowed, then even if a lock release operation is performed individually for each door, the lock release operation of the door lock mechanism is not performed.

An example of the procedure for mounting the finisher 1 of the present embodiment on a vehicle body (i.e., on a back door outer panel) is given below. After the finisher body 2 has been mounted on the bracket 20 that is formed integrally with the switch 40 and has been fixed by the screws 7 and 8, then with the gap between the finisher body 2 and the finisher mounting portion 16 of the back door outer panel 13 set at a predetermined size, the harness 41 is inserted through the through hole 13a in the back door outer panel 13, and the seal member 43 is fitted between the harness 41 and the through hole 13a using a suitable tool. Subsequently, the gap between the finisher body 2 and the finisher mounting portion 16 is closed, and the clip 6 is engaged with the engaging hole 13d of the back door outer panel 13. The bolt 5 is then inserted into the mounting hole 13c of the back door outer panel 13 and, once waterproof properties have been secured by the sealing washer 51, the nut 52 is tightened, thereby firmly mounting the finisher 1 on the vehicle body.

In this manner, according to the finisher for a vehicle of the present embodiment, it is possible to mount a switch 40 that implements or removes operation restrictions on a back door outer panel 13 even on a finisher for a vehicle having a narrow, elongated configuration.

(1) The switch 40 is provided in the vicinity of a center portion in the longitudinal direction of the bracket 20, and fixing portions 21 and 25 that fix the bracket 20 to the finisher body 2 are provided at both end portions in the longitudinal direction of the bracket 20. As a result, the operation force on the switch 40 is distributed between two locations on the finisher body 2, thereby reducing the load on the finisher body 2.

(2) Bracket mounting portions 3n and 4b for mounting the bracket 20 on which the switch 40 is fixed on the finisher body 2 are provided at first and second mounting portions 3 and 4 that are used to mount the finisher body 2 on the back door outer panel 13. As a result, the pressing force when the switch 40 is operated by being pressed is transmitted from the bracket 20 directly to the back door outer panel 13 via the first and second mounting portions 3 and 4.

(3) The first and second mounting portions 3 and 4 to which pressing force on the switch 40 is transmitted via the bracket 20 are formed separated from the rear surface 2b of the finisher body 2 by the upper flange 2e, the lower flange 2f, and the side walls 3a and 3b. As a result, it is difficult for distortion to be generated in the design surface 2a of the finisher body 2 as a result of the pressing force. This fact is particularly meritorious when surface processing to provide a metallic gloss color is performed on the design surface 2a of the finisher by deposition, sputtering, plating or the like.

(4) The upper flange 2e and the lower flange 2f to which the bracket mounting portions 3 and 4 are joined are folded backwards from the edges in the transverse direction of the finisher design surface 2a so as to stand upwards pointing towards the rear surface. As a result, what are known as sink marks are not generated in the design surface 2a, and the external appearance of the finisher can be made extremely attractive. Moreover, because an R of approximately 0.1 to 3 mm is imparted to the fold base portions 2h and 2i of the respective flanges 2e and 2f, there is no sense of sharpness.

(5) The pressing surface 40a of the switch 40 is exposed to the outside of the finisher 1 by the through hole 9 formed in the finisher body 2, and the design surface 2a of the finisher body 2 is essentially flush with the pressing surface 40a of the switch 40. As a result, the existence of the switch 40 does not tend to stand out, and there is an excellent sense of integration with the finisher body.

(6) The concave portion 31 and the rib 33 with which it engages as well as the hook 32 and the groove 34 with which it engages are each provided as a positioning engaging portion 30 that determines the positional relationship between the bracket 20 and the mounting portions 3 and 4 of the finisher body 2. As a result, when fixing the bracket 20 to the finisher body 2, it is difficult for the bracket 20 to move and the task of tightening the fixing members (screws) 7 and 8 is simplified.

The present invention is described above based on preferred embodiments thereof, however, the present invention is not limited solely to these embodiments and various modifications thereof can be made insofar as they do not depart from the scope of the present invention.

For example, the location where the finisher for a vehicle of the present invention is mounted is not limited to a back door panel, and it is also possible for the finisher for a vehicle of the present invention to be mounted on the trunk of a vehicle and the like.

As has been described above, according to the finisher for a vehicle of the present invention, because the operation force on the switch is distributed between two locations on the finisher body, and is also applied from the mounting portions directly to the vehicle body, the load on the finisher body is reduced and it difficult for distortion caused by the pressing force to be generated in the design surface. Moreover, the switch does not stand out and the possibility of the switch being operated unlawfully by someone is reduced.

When a positioning engaging portion that determines a positional relationship between the bracket and the mounting portions is provided, when mounting the bracket on the finisher body, it is difficult for the bracket to move and the task of tightening the fixing members (screws) is simplified.

When the switch is formed integrally with the bracket by outsert molding, it is easy to reliably fix a switch having a larger diameter than the width of the bracket to the bracket, which is excellent from the viewpoint of productivity.

What is claimed is:

1. A finisher for a vehicle having:

an elongated body;

a plurality of mounting portions that are formed protruding from a rear surface side of the body, mounting members that are mounted on a vehicle body being either held by or fixed to the mounting portions; and a bracket formed in an elongated shape and holding a switch in a vicinity of a center portion in a longitudinal direction thereof, wherein the bracket is aligned along a longitudinal direction of the body, and two end portions of the bracket are mounted on the mounting portions in such a manner that a bridge is formed between two adjacent mounting portions from among the plurality of mounting portions, and the switch is operable from a vehicle body exterior side.

2. The finisher for a vehicle according to claim 1, wherein the bracket and the mounting portions have a positioning and engaging portion that determines a positional relationship between the bracket and the mounting portions.

3. The finisher for a vehicle according to claim 1, wherein, via a through hole formed in the body, the switch is exposed to the outside of a vehicle in a state of being set slightly recessed from an exterior surface of the finisher or so as to be essentially flush with the exterior surface of the finisher.

4. The finisher for a vehicle according to claim 1, wherein the switch is formed integrally with the bracket by outsert molding.

* * * * *